United States Patent
Setterberg

(10) Patent No.: US 10,919,485 B2
(45) Date of Patent: Feb. 16, 2021

(54) VEHICLE SEAT BELT ASSEMBLY

(71) Applicant: Volvo Car Corporation, Gothenburg (SE)

(72) Inventor: Peter Setterberg, Partille (SE)

(73) Assignee: Volvo Car Corporation, Gothenburg (SE)

( * ) Notice: Subject to any disclaimer, the term of this patent is extended or adjusted under 35 U.S.C. 154(b) by 137 days.

(21) Appl. No.: 16/211,382

(22) Filed: Dec. 6, 2018

(65) Prior Publication Data
US 2020/0180551 A1    Jun. 11, 2020

(51) Int. Cl.
| B60R 22/12 | (2006.01) |
| B60R 22/22 | (2006.01) |
| B60R 22/24 | (2006.01) |
| B60R 22/26 | (2006.01) |
| B60R 22/46 | (2006.01) |
| B60R 22/18 | (2006.01) |

(52) U.S. Cl.
CPC .............. *B60R 22/12* (2013.01); *B60R 22/22* (2013.01); *B60R 22/24* (2013.01); *B60R 22/26* (2013.01); *B60R 22/46* (2013.01); *B60R 2022/1806* (2013.01)

(58) Field of Classification Search
CPC ........ B60R 2022/027; B60R 2022/028; B60R 2022/1806; B60R 2022/1812; B60R 22/12; B60R 22/19; B60R 22/195; B60R 22/1951; B60R 22/22; B60R 22/24; B60R 22/26; B60R 22/44; B60R 22/46
See application file for complete search history.

(56) References Cited

U.S. PATENT DOCUMENTS 6,042,190 A * 3/2000 Mathe .................. B60N 2/1803
                                                    297/483
6,224,105 B1 * 5/2001 Lake .................. A44B 11/2553
                                                    280/801.1
(Continued)

FOREIGN PATENT DOCUMENTS

CN      101898542 A      12/2010
DE       20117172 U1     3/2003
(Continued)

OTHER PUBLICATIONS

Jan. 27, 2020 European Search Report issued on European Application No. 19212882.

*Primary Examiner* — Laura Freedman
(74) *Attorney, Agent, or Firm* — Clements Bernard Walker; Christopher L. Bernard

(57) ABSTRACT

A vehicle seat belt assembly that ensures proper lap belt and shoulder belt restraint even when an occupant substantially reclines his or her seat. A primary shoulder belt that runs from a buckle member across the chest and shoulder of the occupant and engages a routing device and/or retraction/tensioning device coupled to a pillar, such as a B-pillar, of the body of the vehicle is coupled with a substantially coincident secondary shoulder belt that also runs from the buckle member across the chest and (same) shoulder of the occupant and engages a secondary routing device and/or secondary retraction/tensioning device coupled to a top portion of the seat back, adjacent to the heat rest of the seat and head of the occupant, on the same side of the seat as an anchor point associated with the lap belt.

21 Claims, 5 Drawing Sheets

(56) References Cited

U.S. PATENT DOCUMENTS

| | | | |
|---|---|---|---|
| 6,592,166 B2 * | 7/2003 | Motozawa | B60N 2/06 |
| | | | 296/68.1 |
| 7,249,784 B2 | 7/2007 | Bostrom et al. | |
| 9,302,644 B2 * | 4/2016 | Rouhana | B60R 22/02 |
| 9,669,796 B2 | 6/2017 | Ohno et al. | |
| 2004/0155451 A1 | 8/2004 | Xu | |
| 2018/0236967 A1 | 8/2018 | Jaradi et al. | |

FOREIGN PATENT DOCUMENTS

| | | | |
|---|---|---|---|
| EP | 2108550 A1 | 10/2009 | |
| WO | 2005118330 A2 | 12/2005 | |

* cited by examiner

VEHICLE SEAT BELT ASSEMBLY

FIELD OF THE INVENTION

The present invention relates generally to the automotive field. More specifically, the present invention relates to a vehicle seat belt assembly. The seat belt assembly finds particular applicability in both traditional and autonomous vehicles.

BACKGROUND

A conventional seat belt typically includes a lap belt that, in use, traverses the waist of a vehicle occupant from an anchor point on one side of a vehicle seat to a buckle member and associated receptacle device on the opposite side of the vehicle seat. The lap belt then continues through the buckle member as a shoulder belt back across the chest and shoulder of the vehicle occupant and engages a routing device and/or retraction/tensioning device coupled to a pillar, such as the B-pillar, of the body of the vehicle, adjacent to the heat rest of the vehicle seat and head of the vehicle occupant, on the same side of the vehicle seat as the anchor point. Alternatively, the lap belt terminates at the buckle member, to which the shoulder belt is also coupled. This retraction/tensioning device can be disposed on or within the pillar, or at an intermediate point or the base of the pillar (with the routing device then disposed adjacent to the heat rest of the vehicle seat and head of the vehicle occupant). The retraction/tensioning device serves to spool out and take up belt material when the seat belt is fastened or removed. Optionally, the retraction/tensioning device can include a mechanical or explosive pre-tensioning device that snugs the seat belt against the torso of the vehicle occupant, and the torso of the vehicle occupant against the seat back, in the event of a braking event and/or impact, such that the seat belt can then apply a restraint force against the torso of the vehicle occupant without causing a seat belt injury. Ultimately, the lap belt applies a restraint force against the waist of the vehicle occupant and the shoulder belt applies a restraint force against the torso of the vehicle occupant when the retraction/tensioning device is limited or locks, holding the vehicle occupant securely against the seat bottom and seat back, respectively, during the braking and/or impact event. Although other configurations are possible, most conventional seat belts operate in a similar manner.

Many vehicle occupants prefer to partially or fully recline their vehicle seat while operating or riding in a vehicle in order to enhance their comfort. This is especially true of passengers in an autonomous vehicle, as they are not actively operating the vehicle at all times. In such cases, a vehicle occupant can initially be a dangerous distance away from the shoulder belt, out of reach of the pre-tensioning device, for example. As a result, in a braking event and/or impact, the torso of the vehicle occupant will travel some distance before impacting the shoulder belt at velocity, potentially causing significant injury. Further, such a situation makes submarining more likely, whereby a vehicle occupant is displaced under the lap belt of the seat belt in the event of a braking and/or impact event. Either situation is undesirable.

One potential solution to these problems is to couple the shoulder belt to the top portion of the seat back itself, instead of to the pillar of the body, such that the shoulder belt sits snugly across the chest and shoulder of the vehicle occupant even when the vehicle occupant's seat back is in a reclined position. However, conventional seat backs are not manufactured with sufficient strength to carry the whole load of the vehicle passenger in a braking and/or impact event like the pillar is. Thus, this solution is not feasible without significant (i.e., complex and expensive) modifications to conventional vehicle seats. It should also be noted that various multi-belt seat belt assemblies have been proposed and developed, but most are intended to limit only lateral motion of a vehicle occupant during a braking, turning, and/or impact event. Typically, such multi-belt seat belt assemblies have utilized parallel or intersecting shoulder belts that simultaneously secure opposite shoulders of the vehicle occupant to the seat back and/or pillar and/or other structures of the vehicle. None address the reclined seat back problem addressed herein. All assume a substantially upright vehicle occupant position.

Thus, what is needed in the art is a vehicle seat belt assembly and method for restraining a vehicle occupant that ensures proper lap belt and shoulder belt restraint even when a vehicle occupant reclines his or her seat, thereby preventing undesirable shoulder belt slack and lap belt submarining, among other problems.

BRIEF SUMMARY OF THE INVENTION

The present invention provides a (three-point) vehicle seat belt assembly and method of restraining a vehicle occupant that ensures proper lap belt and shoulder belt restraint even when a vehicle occupant reclines his or her seat. The primary shoulder belt that runs from the buckle member across the chest and shoulder of the vehicle occupant and engages the routing device and/or retraction/tensioning device coupled to the pillar, such as the B-pillar, of the body of the vehicle is paired with a substantially coincident secondary shoulder belt that also runs from the buckle member across the chest and (same) shoulder of the vehicle occupant and engages a secondary routing device and/or secondary retraction/tensioning device coupled to the top portion of the seat back, adjacent to the heat rest of the vehicle seat and head of the vehicle occupant, on the same side of the vehicle seat as the anchor point. This secondary retraction/tensioning device can be disposed on or within the seat back, or at an intermediate point or the base of the seat back or seat (with the secondary routing device disposed adjacent to the heat rest of the vehicle seat and head of the vehicle occupant). The secondary retraction/tensioning device serves to spool out and take up secondary belt material when the seat belt is fastened or removed. Again, the secondary retraction/tensioning device can include a secondary mechanical or explosive pre-tensioning device that snugs the seat belt against the torso of the vehicle occupant, and the torso of the vehicle occupant against the seat back, in the event of a braking event and/or impact, such that the seat belt can then apply a restraint force against the torso of the vehicle occupant without causing a seat belt injury. In the event of a braking and/or impact event, the secondary shoulder belt first holds the torso of the (potentially reclined) vehicle occupant against the seat back with a lesser restraint force (within the limits of the seat) until the vehicle occupant and seat back have traveled far enough forward to engage the primary shoulder belt with a greater restraint force (within the limits of the pillar). Again, ultimately, the lap belt applies a restraint force against the waist of the vehicle occupant and the primary shoulder belt applies a restraint force against the torso of the vehicle occupant when the primary retraction/tensioning device is limited or locks, holding the vehicle occupant securely against the seat bottom and seat back, respectively. However, the secondary shoulder belt first applies an initial restraint force against the torso of the vehicle occupant, securing him or her to the seat back regardless of recline position, when the secondary retraction/tensioning device is limited or locks.

Advantageously, the vehicle seat belt assembly of the present invention requires no extra effort on the part of the vehicle occupant to use. Both the primary shoulder belt and the secondary shoulder belt are engaged with conventional buckle member-receptacle device engagement. Seat belt fit and feel are as normal.

BRIEF DESCRIPTION OF THE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
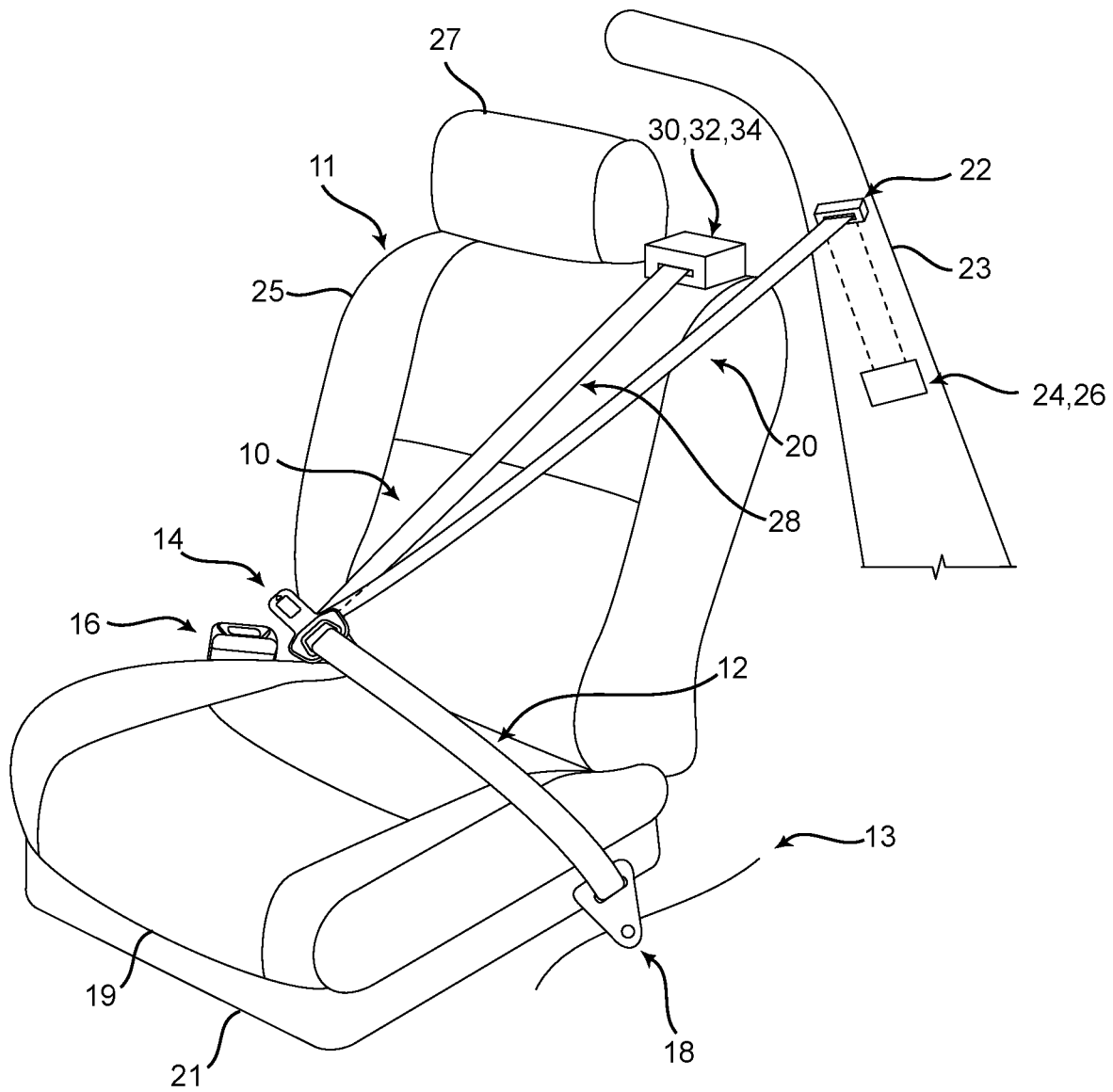
FIG. 1 is a perspective view of one exemplary embodiment of the seat belt assembly of the present invention, utilizing a lap belt, a primary shoulder belt, and a substantially coincident secondary shoulder belt.

Again, the present invention provides a (three-point) vehicle seat belt assembly and method of restraining a vehicle occupant that ensures proper lap belt and shoulder belt restraint even when a vehicle occupant reclines his or her seat. The primary shoulder belt that runs from the buckle member across the chest and shoulder of the vehicle occupant and engages the routing device and/or retraction/tensioning device coupled to the pillar, such as the B-pillar, of the body of the vehicle is paired with a substantially coincident secondary shoulder belt that also runs from the buckle member across the chest and (same) shoulder of the vehicle occupant and engages a secondary routing device and/or secondary retraction/tensioning device coupled to the top portion of the seat back, adjacent to the heat rest of the vehicle seat and head of the vehicle occupant, on the same side of the vehicle seat as the anchor point. This secondary retraction/tensioning device can be disposed on or within the seat back, or at an intermediate point or the base of the seat back or seat (with the secondary routing device disposed adjacent to the heat rest of the vehicle seat and head of the vehicle occupant). The secondary retraction/tensioning device serves to spool out and take up secondary belt material when the seat belt is fastened or removed. Again, the secondary retraction/tensioning device can include a secondary mechanical or explosive pre-tensioning device that snugs the seat belt against the torso of the vehicle occupant, and the torso of the vehicle occupant against the seat back, in the event of a braking event and/or impact, such that the seat belt can then apply a restraint force against the torso of the vehicle occupant without causing a seat belt injury. In the event of a braking and/or impact event, the secondary shoulder belt first holds the torso of the (potentially reclined) vehicle occupant against the seat back with a lesser restraint force (within the limits of the seat) until the vehicle occupant and seat back have traveled far enough forward to engage the primary shoulder belt with a greater restraint force (within the limits of the pillar). Again, ultimately, the lap belt applies a restraint force against the waist of the vehicle occupant and the primary shoulder belt applies a restraint force against the torso of the vehicle occupant when the primary retraction/tensioning device is limited or locks, holding the vehicle occupant securely against the seat bottom and seat back, respectively. However, the secondary shoulder belt first applies an initial restraint force against the torso of the vehicle occupant, securing him or her to the seat back regardless of recline position, when the secondary retraction/tensioning device is limited or locks.

Advantageously, the vehicle seat belt assembly of the present invention requires no extra effort on the part of the vehicle occupant to use. Both the primary shoulder belt and the secondary shoulder belt are engaged with conventional buckle member-receptacle device engagement. Seat belt fit and feel are as normal.

Referring now specifically to FIG. 1, in one exemplary embodiment, the seat belt assembly 10 of the present invention, when fastened, is disposed about a vehicle seat 11 and the waist and chest and shoulder of a vehicle occupant seated in the seat 11, as a conventional seat belt assembly is.

In general, the seat belt assembly 10 includes a lap belt 12 that is coupled to the body 13 of the vehicle on one side of the seat 11 at one end and to a buckle member 14 that is configured to selectively engage a receptacle device 16 disposed on an opposite side of the seat 11 at an opposite end. The buckle member 14 and the receptacle device 16 form a detachable anchor point for the seat belt assembly 10. At one end, the lap belt 12 is preferably coupled to a fixed or pivoting anchor member 18 disposed along or protruding from the floor of the vehicle, adjacent to a side of the seat bottom 19 and/or seat base 21. Alternatively, the lap belt 12 can be directly or indirectly coupled to a retraction/tensioning device (described in greater detail herein below) at this point. At the opposite end, the lap belt 12 is coupled to or passes through a body or slot manufactured into the buckle member 14, which includes a tab for securely engaging the receptacle device 16 with the push of a button or the like. The receptacle device 16 is rigidly or pivotably disposed along or protruding from the floor of the vehicle, adjacent to a side of the seat bottom 19 and/or seat base 21 opposite the anchor member 18. In general, these components are well known to those of ordinary skill in the art. Again, the buckle member 14 and receptacle device 16 collectively form a detachable anchor point when engaged with one another. In use, the lap belt 12 is configured to be selectively disposed across the waist of the occupant. As the lap belt 12 passes through the buckle member 14 and/or is retractable, its length can vary to comfortably accommodate different occupants. The lap belt 12 is made of a webbing material that receives and softens the force of a braking and/or impact event, such as polyester or nylon webbing material woven from warp and weft strands.

The seat belt assembly 10 also includes a primary shoulder belt 20 that is coupled to the buckle member 14 at one end and to the body (i.e., a pillar 23, such as the B-pillar) of the vehicle at an opposite end. The primary shoulder belt 20 is configured to be selectively disposed across the chest and shoulder of the occupant when fastened. Again, the primary shoulder belt 20 is made of a webbing material that receives and softens the force of a braking and/or impact event, such as polyester or nylon webbing material. Optionally, the lap belt 12 and the primary shoulder belt 20 are integrally formed, consisting of one unitary belt that passes through the buckle member 14 between the anchor member 18 and the pillar 23, making both the lap belt 12 and the primary shoulder belt 20 adjustable to comfortably accommodate different occupants. In this case, the movement of the buckle member 14 along the unitary belt is typically limited to a range, and the buckle member 14 acts as a demarcation point between what is ultimately referred to as the lap belt 12 and the primary shoulder belt 20.

The opposite end of the primary shoulder belt 20 is coupled to the pillar 23 of the vehicle via one or more of a primary routing device 22 and a primary retraction/tensioning device 24. For example, the primary shoulder belt 20 can first be received by the primary routing device 22 at a relatively higher position along the pillar 23, such as adjacent to the top portion of the seat back 25, the head rest 27, and the head of the occupant. The primary shoulder belt 20 can then be fed to the primary retraction/tensioning device 24 at a relatively lower position along/within the pillar 23 or along the body and/or floor of the vehicle. Alternatively, the primary routing device 22 and primary retraction/tensioning device 24 can be integral or collocated at the upper portion of the pillar 23. The primary retraction/tensioning device 24 is operable for spooling out and taking up primary belt material when the seat belt assembly 10 is fastened and removed and limiting spooling out (i.e., locking) of the primary belt material upon the occurrence of a braking and/or impact event.

Optionally, the primary retraction/tensioning device 24 includes a mechanical or explosive primary pre-tensioning device 26 operable for removing slack from the primary shoulder belt 20 upon the occurrence of the braking and/or impact event. Such pre-tensioning devices are well known to those of ordinary skill in the art. All such pre-tensioning devices will act on both the lap belt 12 and the primary shoulder belt 20 in the event that a unitary belt is used, as described herein above.

The seat belt assembly 10 further includes a secondary shoulder belt 28 coupled to the buckle member 14 at one end and to a top portion of the seat back 25 of the seat 11 adjacent to the pillar 23 of the vehicle at an opposite end. The secondary shoulder belt 28 travels along substantially the same path as the primary shoulder belt 20, at least in proximity to the buckle member 14. Thus, the secondary shoulder belt 28 is configured to be selectively disposed across the chest and same shoulder of the occupant as the primary shoulder belt 20 when fastened. Again, the secondary shoulder belt 28 is made of a webbing material that receives and softens the force of a braking and/or impact event, such as polyester or nylon webbing material. Preferably, the secondary shoulder belt 28 is coupled directly to the buckle member 14 via an attachment mechanism and/or stitched or otherwise anchored to the primary shoulder belt 20 at or near the buckle member 14 and/or the demarcation point with the lap belt 12. Optionally, the lap belt 12 and the secondary shoulder belt 28 are integrally formed, consisting of one unitary belt that passes through a slot of the buckle member 14 between the anchor member 18 and the seat back 25, making both the lap belt 12 and the secondary shoulder belt 28 adjustable to comfortably accommodate different occupants. In this case, the movement of the buckle member 14 along the unitary belt is again typically limited to a range, and the buckle member 14 acts as a demarcation point between what is ultimately referred to as the lap belt 12 and the secondary shoulder belt 28.

In an alternative exemplary embodiment, a first lap belt 12 and the primary shoulder belt 20 form one integrally formed, unitary belt and a second lap belt 12 and the secondary shoulder belt 28 form another integrally formed, unitary belt, both of which pass through the slot of the buckle member 14. In this embodiment, the lap belt 12 is effectively doubled in thickness.

The opposite end of the secondary shoulder belt 28 is coupled to the seat back 25 of the seat 11 of the vehicle via one or more of a secondary routing device 30 and a secondary retraction/tensioning device 32. For example, the secondary shoulder belt 28 can first be received by the secondary routing device 30 at a relatively higher position along the top portion of the seat back 25, such as adjacent to the head rest 27 and the head of the occupant. The secondary shoulder belt 28 can then be fed to the secondary retraction/tensioning device 32 at a relatively lower position along/within the seat back 25 or along the body and/or floor of the vehicle behind the seat 11. Alternatively, the secondary routing device 30 and secondary retraction/tensioning device 32 can be integral or collocated at the top portion of the seat back 25. The secondary retraction/tensioning device 32 is operable for spooling out and taking up secondary belt material when the seat belt assembly 10 is fastened and removed and limiting spooling out (i.e., locking) of the secondary belt material upon the occurrence of the braking and/or impact event.

Optionally, the secondary retraction/tensioning device 32 includes a mechanical or explosive secondary pre-tensioning device 34 operable for removing slack from the secondary shoulder belt 28 upon the occurrence of the braking and/or impact event. Such pre-tensioning devices are well known to those of ordinary skill in the art. All such pre-tensioning devices will act on both the lap belt 12 and the secondary shoulder belt 28 in the event that a unitary belt is used, as described herein above.

In the event of a braking and/or impact event, the secondary shoulder 28 belt first holds the torso of the (potentially reclined) vehicle occupant against the seat back 25 with a lesser restraint force (within the limits of the seat 11) until the vehicle occupant and seat back 25 have traveled far enough forward to engage the primary shoulder belt 20 with a greater restraint force (within the limits of the pillar 23). Ultimately, the lap belt 12 applies a restraint force against the waist of the vehicle occupant and the primary shoulder belt 20 applies a restraint force against the torso of the vehicle occupant when the primary retraction/tensioning device 24 is limited or locks, holding the vehicle occupant securely against the seat bottom 19 and seat back 25, respectively. However, the secondary shoulder belt 28 first applies an initial restraint force against the torso of the vehicle occupant, securing him or her to the seat back 25 regardless of recline position, when the secondary retraction/tensioning device 32 is limited or locks.

Figure 2:
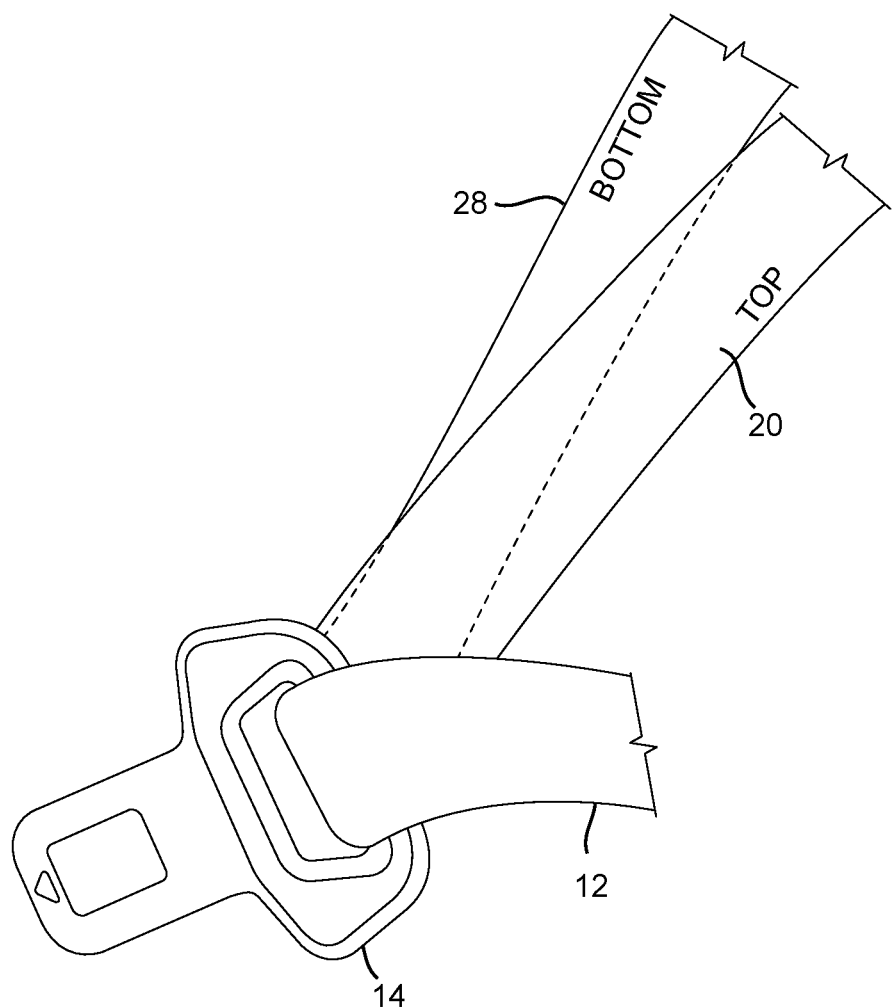
FIG. 2 is a perspective view of one exemplary embodiment of the arrangement of the lap belt, the primary shoulder belt, and the secondary shoulder belt at the buckle member of the seat belt assembly of FIG. 1.

FIG. 2 illustrates one possible configuration for the various belts and the buckle member 14. In this exemplary embodiment, the lap belt 12, the primary shoulder belt 20, and the secondary shoulder belt 28 all engage the buckle member 14, whether by being secured to it and/or passing through it. It is generally desirable, although not absolutely necessary, that the secondary should belt 28 is disposed beneath the primary shoulder belt 20, such that it is in a position to first engage the chest and shoulder of the vehicle occupant in a braking and/or impact event.

Figure 3:
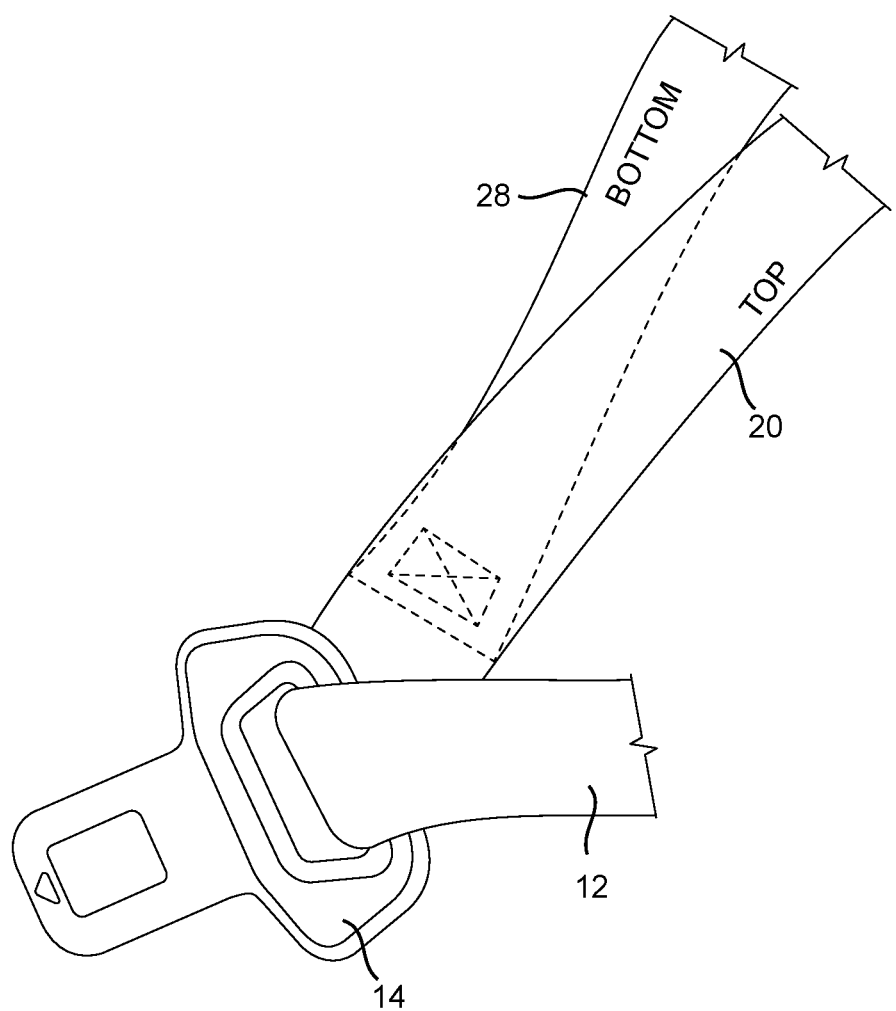
FIG. 3 is a perspective view of another exemplary embodiment of the arrangement of the lap belt, the primary shoulder belt, and the secondary shoulder belt at the buckle member of the seat belt assembly of FIG. 1.

FIG. 3 illustrates another possible configuration for the various belts and the buckle member 14. In this exemplary embodiment, the lap belt 12 and the primary shoulder belt 20 engage the buckle member 14, whether by being secured to it and/or passing through it. The secondary shoulder belt 28 is then secured to the primary shoulder belt 20 in the proximity of the buckle member 14, such as by stitching or the like. Again, it is generally desirable, although not absolutely necessary, that the secondary should belt 28 is disposed beneath the primary shoulder belt 20, such that it is in a position to first engage the chest and shoulder of the vehicle occupant in a braking and/or impact event.

Figure 4:
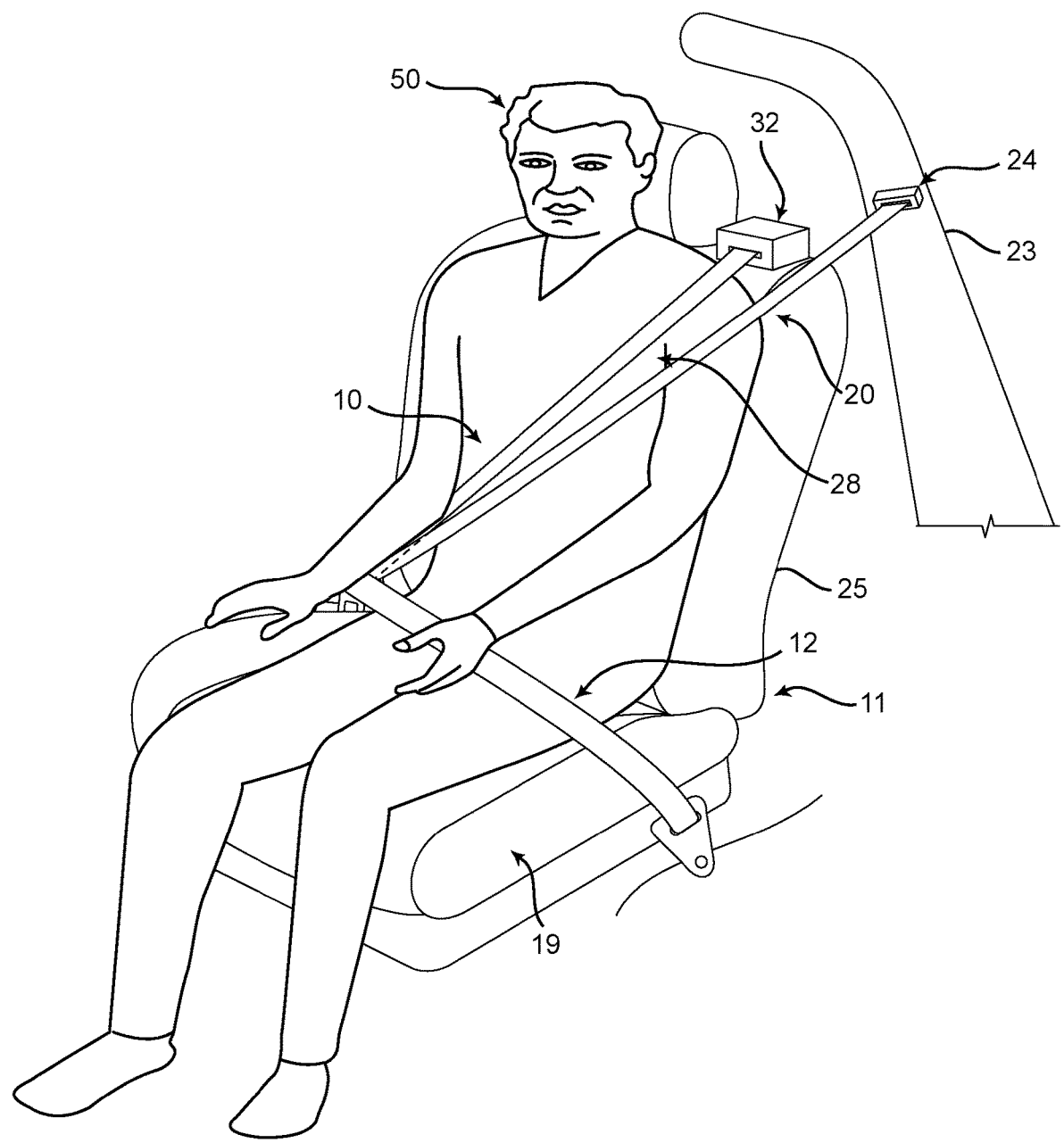
FIG. 4 is a perspective view of the seat belt assembly of FIG. 1 in use, with a vehicle occupant seated in a vehicle seat in a substantially upright position.

FIG. 4 illustrates the interaction of a vehicle occupant 50 with the seat belt assembly 10 of the present invention. Again, in the event of a braking and/or impact event, the secondary shoulder 28 belt first holds the torso of the (potentially reclined) vehicle occupant 50 against the seat back 25 with a lesser restraint force (within the limits of the seat 11) until the vehicle occupant 50 and seat back 25 have traveled far enough forward to engage the primary shoulder belt 20 with a greater restraint force (within the limits of the pillar 23). Ultimately, the lap belt 12 applies a restraint force against the waist of the vehicle occupant 50 and the primary shoulder belt 20 applies a restraint force against the torso of the vehicle occupant 50 when the primary retraction/tensioning device 24 is limited or locks, holding the vehicle occupant 50 securely against the seat bottom 19 and seat back 25, respectively. However, the secondary shoulder belt 28 first applies an initial restraint force against the torso of the vehicle occupant 50, securing him or her to the seat back 25 regardless of recline position, when the secondary retraction/tensioning device 32 is limited or locks.

Figure 5:
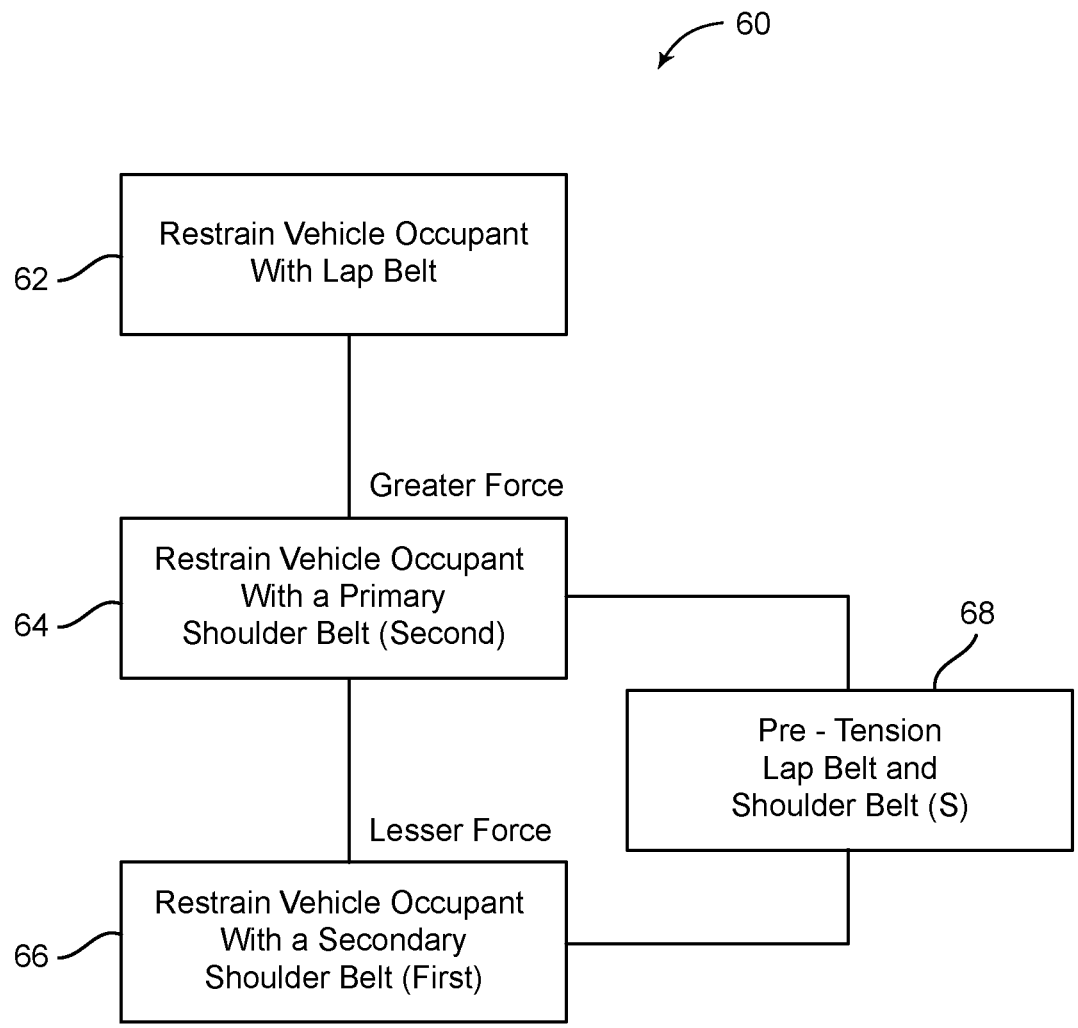
FIG. 5 is a flowchart illustrating one exemplary embodiment of the method for restraining a vehicle occupant of the present invention, again utilizing a lap belt, a primary shoulder belt, and a substantially coincident secondary shoulder belt.

Referring now specifically to FIG. 5, in one exemplary embodiment, the present invention provides a method 60 of restraining an occupant in a seat of a vehicle. The method 60 includes restraining the waist of the occupant using a lap belt coupled to a body of the vehicle on one side of the seat at one end and to a buckle member engaging a receptacle device disposed on an opposite side of the seat at an opposite end 62. The method 60 also includes restraining the chest and shoulder of the occupant using a primary shoulder belt coupled to the buckle member at one end and to the body of the vehicle at an opposite end 64. The method 60 further includes restraining the chest and same shoulder of the occupant using a secondary shoulder belt coupled to the buckle member at one end and to a top portion of a seat back of the seat adjacent to the body of the vehicle at an opposite end 66. Optionally, the method 60 further includes pre-tensioning one or more of the primary shoulder belt by removing slack from the primary shoulder belt and the secondary shoulder belt by removing slack from the secondary shoulder belt upon the occurrence of the braking and/or impact event 68. When the seat back is in a reclined configuration, restraining the chest and shoulder of the occupant using the primary shoulder belt 64 and restraining the chest and same shoulder of the occupant using the secondary shoulder belt 66 includes first restraining the chest and shoulder of the occupant using the secondary shoulder belt with a relatively lesser restraint force 66 and second restraining the chest and same shoulder of the occupant using the primary shoulder belt with a relatively greater restraint force 64.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

The invention claimed is:

1. A buckle member for providing restraining forces to belts of a seat belt assembly, the buckle member comprising body means adapted to receive a lap belt configured to be selectively disposed across a waist of a vehicle occupant, a primary shoulder belt configured to be selectively disposed across a chest and shoulder of the vehicle occupant, and a secondary shoulder belt configured to be selectively disposed across the chest and same shoulder of the vehicle occupant, wherein, when a seat back of a seat to which the buckle member is coupled is in a reclined configuration upon occurrence of a braking and/or impact event, the body means is configured to apply a relatively lesser restraining force to the secondary shoulder belt that first restrains the chest and same shoulder of the vehicle occupant and apply a relatively greater restraining force to the primary shoulder belt that second restrains the chest and shoulder of the vehicle occupant.

2. The buckle member of claim 1, further comprising a tab structure coupled to the body means, the tab structure adapted to selectively engage a receptacle device anchored to a body of a vehicle.

3. The buckle member of claim 1, where the lap belt and the primary shoulder belt are integrally formed portions of a primary unitary belt, and wherein the body means defines a slot adapted to receive the primary unitary belt there through.

4. The buckle member of claim 1, wherein the body means comprises an attachment mechanism adapted to securely receive an end portion of the secondary shoulder belt.

5. The buckle member of claim 1, where the lap belt and the secondary shoulder belt are integrally formed portions of a secondary unitary belt, and wherein the body means defines a slot adapted to receive the secondary unitary belt there through.

6. A belt assembly for use in a seat belt assembly, the belt assembly comprising:
   a unitary belt having a primary lap belt portion adapted to be coupled to a body of a vehicle on one side of a seat at one end and to a detachable anchor point disposed on an opposite side of the seat at an opposite end and a primary shoulder belt portion adapted to be coupled to the detachable anchor point at one end and to the body of the vehicle at an opposite end; and
   a secondary shoulder belt adapted to be coupled to one of the detachable anchor point and the one end of the primary shoulder belt portion of the unitary belt in proximity to the detachable anchor point at one end and to a top portion of a seat back of the seat adjacent to the body of the vehicle at an opposite ends;
   wherein, when the seat back of the seat is in a reclined configuration upon occurrence of a braking and/or impact event, the secondary shoulder belt is configured to apply a relatively lesser restraining force that first restrains a vehicle occupant and the primary shoulder belt portion is configured to apply a relatively greater restraining force that second restrains the vehicle occupant.

7. The belt assembly of claim 6, where, in use, the primary lap belt portion of the unitary belt is configured to be selectively disposed across a waist of the vehicle occupant, the primary shoulder belt portion of the unitary belt is configured to be selectively disposed across a chest and shoulder of the vehicle occupant, and the secondary shoulder belt is configured to be selectively disposed across the chest and same shoulder of the vehicle occupant.

8. The belt assembly of claim 6, wherein the one end of the secondary shoulder belt is stitched to the one end of the primary shoulder belt portion of the unitary belt in proximity to the detachable anchor point.

9. The belt assembly of claim 6, where the detachable anchor point is a buckle member, where the unitary belt is adapted to be threaded through a slot defined by the buckle member, the buckle member separating the primary lap belt portion from the primary shoulder belt portion in use, and where the one end of the secondary shoulder belt is adapted to be anchored to the buckle member.

10. The belt assembly of claim 6, wherein the secondary shoulder belt is integrally formed with a secondary lap belt adapted to be coupled to the body of the vehicle on one side of the seat at one end and to the detachable anchor point disposed on the opposite side of the seat at an opposite end, where the primary lap belt portion and the secondary lap belt are disposed in a substantially coincident configuration in use.

11. A seat belt assembly for use in a vehicle including a seat configured to receive a vehicle occupant, the seat belt assembly comprising:
  a buckle member adapted to selectively engage a receptacle device disposed on one side of the seat and anchored to a body of the vehicle;
  a lap belt adapted to be coupled to the body of the vehicle on an opposite side of the seat at one end and coupled to the buckle member at an opposite end, where the lap belt is configured to be selectively disposed across a waist of the vehicle occupant in use;
  a primary shoulder belt coupled to the buckle member at one end and adapted to be coupled to the body of the vehicle at an opposite end, where the primary shoulder belt is configured to be selectively disposed across a chest and shoulder of the vehicle occupant; and
  a secondary shoulder belt coupled to the buckle member at one end and adapted to be coupled to a top portion of a seat back of the seat adjacent to the body of the vehicle at an opposite end, where the secondary shoulder belt is configured to be selectively disposed across the chest and same shoulder of the vehicle occupant;
  wherein, when the seat back of the seat is in a reclined configuration upon occurrence of a braking and/or impact event, the secondary shoulder belt is configured to apply a relatively lesser restraining force that first restrains the chest and same shoulder of the vehicle occupant and the primary shoulder belt is configured to apply a relatively greater restraining force that second restrains the chest and shoulder of the vehicle occupant.

12. The seat belt assembly of claim 11, wherein the one end of the lap belt is adapted to be coupled to the body of the vehicle at a fixed anchor point disposed on the opposite side of the seat.

13. The seat belt assembly of claim 11, wherein the opposite end of the primary shoulder belt is adapted to be coupled to the body of the vehicle via one or more of a primary routing device and a primary retraction/tensioning device operable for spooling out and taking up primary belt material when the buckle member is fastened to and removed from the receptacle device and limiting spooling out of the primary belt material upon the occurrence of the braking and/or impact event.

14. The seat belt assembly of claim 13, where the primary retraction/tensioning device includes a primary pre-tensioning device operable for removing slack from the primary shoulder belt upon the occurrence of the braking and/or impact event.

15. The seat belt assembly of claim 11, wherein the opposite end of the secondary shoulder belt is adapted to be coupled to the top portion of the seat back of the seat via one or more of a routing device and a secondary retraction/tensioning device operable for spooling out and taking up secondary belt material when the buckle member is fastened to and removed from the receptacle device and limiting spooling out of the secondary belt material upon the occurrence of the braking and/or impact event.

16. The seat belt assembly of claim 15, where the secondary retraction/tensioning device includes a secondary pre-tensioning device operable for removing slack from the secondary shoulder belt upon the occurrence of the braking and/or impact event.

17. The seat belt assembly of claim 11, wherein the lap belt and the primary shoulder belt are integrally formed.

18. The seat belt assembly of claim 17, wherein the one end of the secondary shoulder belt is one of coupled directly to the buckle member and secured to the one end of the primary shoulder belt in proximity to the buckle member.

19. The seat belt assembly of claim 11, wherein the lap belt comprises a primary lap belt that is integrally formed with the primary shoulder belt and a secondary lap belt that is integrally formed with the secondary shoulder belt, where the primary lap belt and the secondary lap belt are disposed in a substantially coincident configuration in use.

20. A method of applying a restraining force to an occupant in a seat of a vehicle upon occurrence of a braking and/or impact event, the method comprising:
  providing a lap belt coupled to a body of the vehicle on one side of the seat at one end and to a buckle member engaging a receptacle device disposed on an opposite side of the seat and anchored to the body of the vehicle at an opposite end, wherein the lap belt is configured to apply a restraining force to a waist of the occupant;
  providing a primary shoulder belt coupled to the buckle member at one end and to the body of the vehicle at an opposite end, wherein the primary shoulder belt is configured to apply a restraining force to a chest and shoulder of the occupant; and
  providing a secondary shoulder belt coupled to the buckle member at one end and to a top portion of a seat back of the seat adjacent to the body of the vehicle at an opposite end, wherein the secondary shoulder belt is configured to apply a restraining force to the chest and same shoulder of the occupant;
  wherein, when the seat back is in a reclined configuration upon the occurrence of the braking and/or impact event, the secondary shoulder belt is configured to first restrain the chest and same shoulder of the occupant with a relatively lesser restraining force and the primary shoulder belt is configured to second restrain the chest and shoulder of the occupant with a relatively greater restraining force.

21. The method of claim 20, further comprising one or more of pre-tensioning the lap belt by removing slack from the lap belt prior to applying the restraining force using the lap belt, pre-tensioning the primary shoulder belt by removing slack from the primary shoulder belt prior to applying the restraining force using the primary shoulder belt, and pre-tensioning the secondary shoulder belt by removing slack from the secondary shoulder belt prior to applying the restraining force using the secondary shoulder belt upon the occurrence of the braking and/or impact event.

* * * * *